Dec. 31, 1935. E. WILKINSON 2,026,334
LIVESTOCK HUTCH
Filed June 24, 1931 4 Sheets-Sheet 1
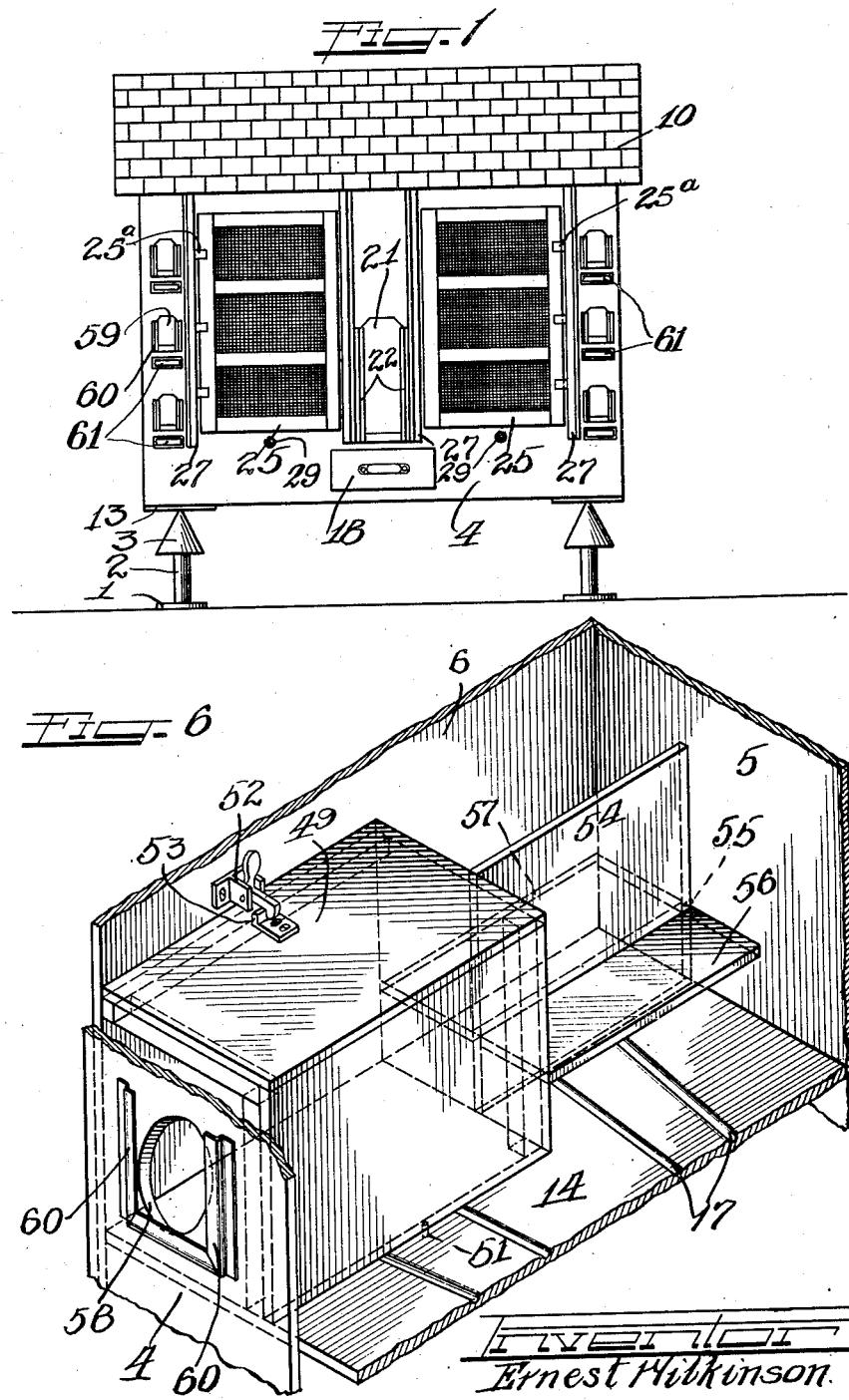

Dec. 31, 1935. E. WILKINSON 2,026,334
LIVESTOCK HUTCH
Filed June 24, 1931 4 Sheets-Sheet 2
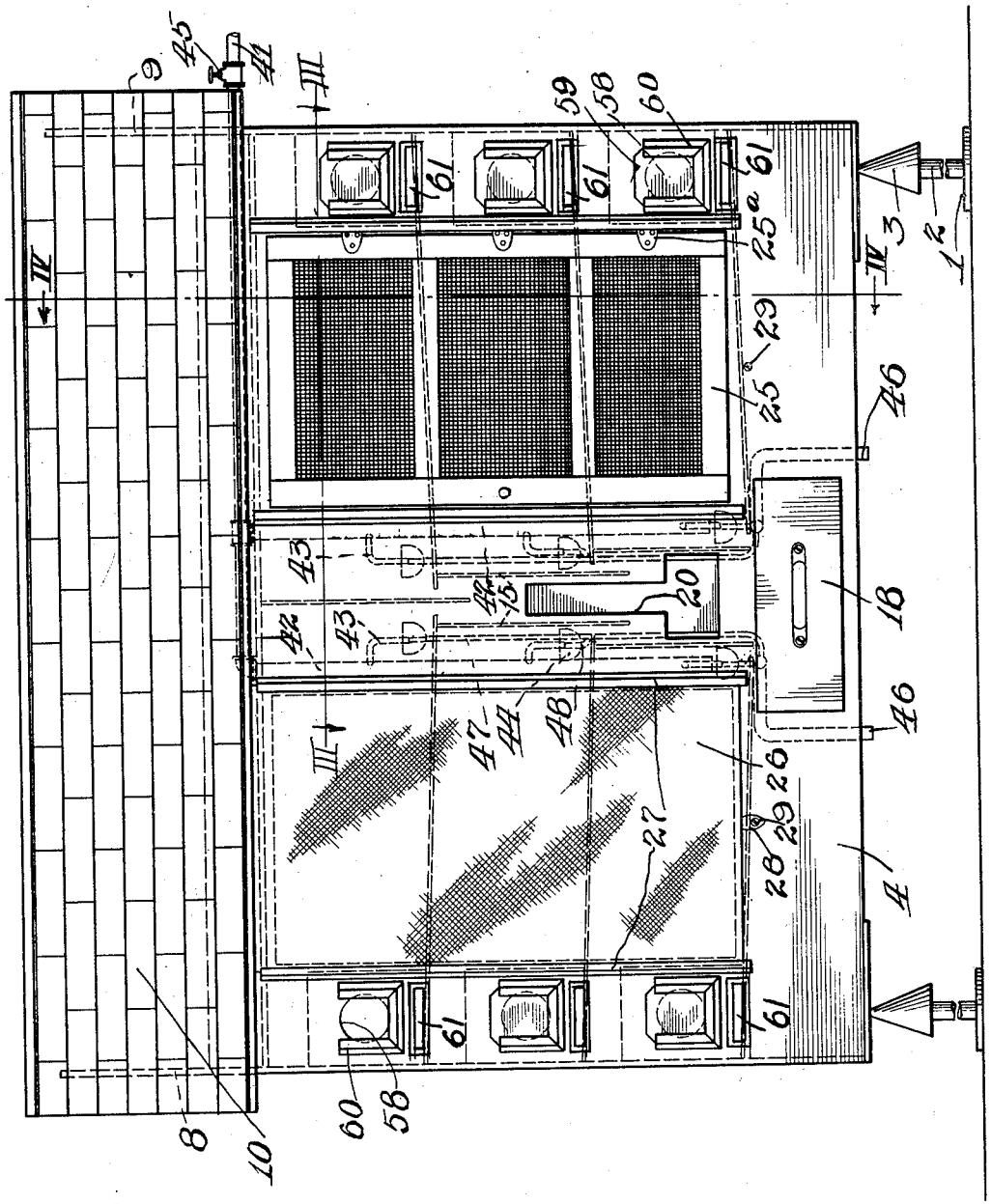

Dec. 31, 1935.  E. WILKINSON  2,026,334
LIVESTOCK HUTCH
Filed June 24, 1931  4 Sheets-Sheet 3
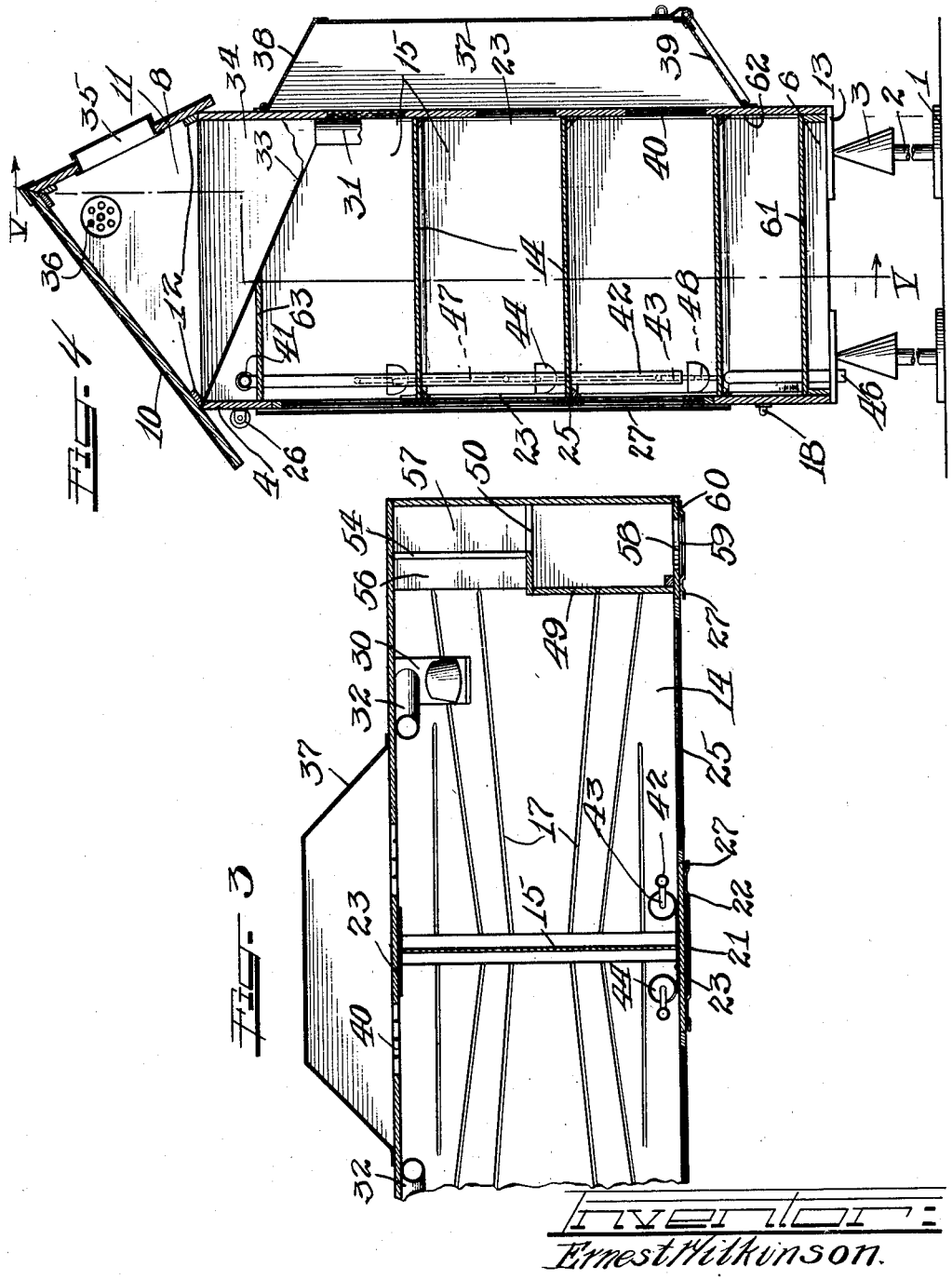
Inventor:
Ernest Wilkinson.
by Charles W. Hill Attys

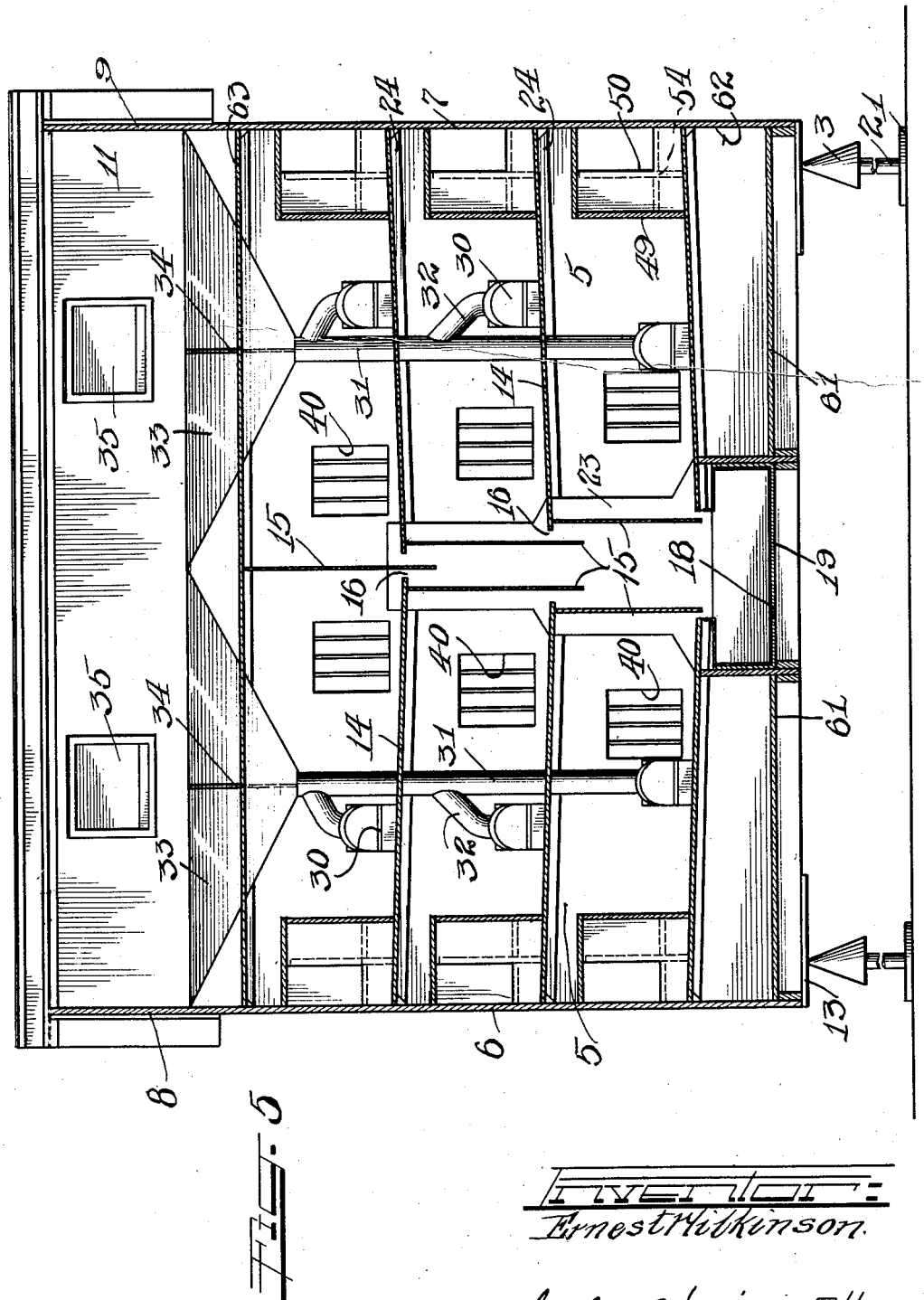

Patented Dec. 31, 1935

2,026,334

UNITED STATES PATENT OFFICE 2,026,334

LIVESTOCK HUTCH

Ernest Wilkinson, Chicago, Ill.

Application June 24, 1931, Serial No. 546,470

14 Claims. (Cl. 119—16)

This invention relates to improvements in live stock hutches of the character desirable for breeding and raising small live stock, the invention being highly desirable for rabbit production although the invention is also desirable for the production of cavies and similar live stock, the invention having many and various uses as will be apparent to one skilled in the art.

Live stock hutches, and especially rabbit hutches, as built in the past, were open to many and various objections. The major objection to hutches has been the very considerable loss of stock, the odors arising from the hutches and the amount of labor and attention necessary for the proper production of the stock, all these undesirable features resulting directly from the construction of the hutches. The loss of stock due to inclement weather and other reasons, and the amount of labor required have been extremely serious causes of worry and expense to producers of rabbits as well as of other live stock.

The labor required resides chiefly in cleaning the hutches, feeding and watering the animals, and in endeavoring to properly look after the young animals. With hutches as heretofore constructed, many young animals have been killed by the doe or mother jumping directly into the nest box or by the mother becoming frightened at necessary attention of the workmen. Also, if drafts are permitted to enter the hutches, snow or rain permitted to pass through the doors, and no protection provided in very cold weather, rabbits and similar small live stock are subject to the contraction of colds, snuffles, pneumonia and similar diseases in animals. The small live stock industry, especially the raising of rabbits both as a source of food and fur, has now developed to a considerable extent, and in the raising of such small live stock on a commercial basis, it is of the greatest importance that large healthy animals be produced as economically as possible.

With the foregoing in mind, it is an object of this invention to provide a hutch for rabbits and other small live stock, which, by simple adjustment, can be rendered substantially draft-proof.

It is also an object of this invention to provide a hutch of the character described herein, which while admitting plenty of light and air through the doors thereof, is at all times substantially draft-proof in that there is no outlet other than the doors for the air entering therethrough.

It is also an object of this invention to provide a hutch for small live stock wherein the excrement from the animals is automatically collected in a single container from all compartments of the hutch, which container is easily withdrawn and emptied into a receptacle, whereby the excrement is prevented from ever touching the ground and is preserved for subsequent use for fertilizer.

It is another object of this invention to provide a hutch divided interiorly into separate compartments, the hutch embodying means for automatically providing feeds of the character of grain or mash, feeds of the character of hay or alfalfa, and water to each compartment within the hutch.

It is still another object of this invention to provide a hutch divided interiorly into separate compartments, and providing storage rooms or bins for holding a sufficient quantity of food to last practically any desired length of time, which food is automatically delivered from the bins to each compartment within the hutch.

A still further object of this invention is the provision of a hutch embodying a number of compartments, and wherein food and water is automatically supplied to each compartment in such a manner that the animal occupant is prevented from spilling, treading upon, or otherwise damaging any of the food and is also prevented from spilling or contaminating any of the water.

It is still a further object of this invention to provide a hutch for small live stock, the hutch being especially designed for the elimination of unwelcome odors.

Another object of this invention is the provision of a hutch provided with a nest box for each compartment therein and a tortuous entrance for each nest box, whereby the animal occupant is prevented from jumping directly into the nest and thus injuring the young.

Still another object of the invention is the provision of a hutch mounted on a vermin-proof foundation.

While some of the more salient features, characteristics and advantages of a device embodying this invention have been above pointed out, others will become apparent from the following disclosure.

The invention includes these and other features of construction and combinations of parts hereinafter described, and shown in a preferred form in the drawings, as more particularly indicated by the claims.

On the drawings:

Figure 1 is a front view in elevation of a hutch and foundation embodying principles of the present invention.

Figure 2 is an enlarged front elevational view of the structure shown in Figure 1, with parts removed, and additionally illustrating the watering system.

Figure 3 is a fragmentary plan sectional view taken substantially as indicated by the line III—III of Figure 2.

Figure 4 is a vertical sectional view taken substantially as indicated by the line IV—IV of Figure 2.

Figure 5 is a vertical sectional view taken substantially as indicated by the line V—V of Figure 4.

Figure 6 is an enlarged fragmentary isometric view of the end region of one of the hutch compartments illustrating the nest box and entrance thereto.

As shown on the drawings:

In the illustrated embodiment of this invention, there is shown a rabbit hutch mounted upon a foundation comprising unitary elements disposed at suitable intervals beneath the hutch, each element including a base flange 1, a support 2 rising therefrom, and a conical top piece 3, the hutch resting upon the points of the various cones. Obviously, with the hollow conical pieces 3 disposed over the support 2, the conical pieces having a base diameter greatly in excess of that of the support 2, vermin, rodents, and the like are effectively prevented from gaining access to the hutch.

The hutch itself includes four walls, namely, a front wall 4, a rear wall 5, and a pair of end or side walls 6 and 7 respectively, the side walls 6 and 7 being provided with triangular upper portions 8 and 9 respectively for properly supporting a gable roof including a front portion 10 and a rear portion 11. Each of the roof portions 10 and 11 is provided interiorly with a batten 12 engageable over the upper edges of the front and partment. To further this automatic removal of excrement or waste material, each of the floors 14 is provided with a plurality of grooves 17 (Figures 3 and 6), and it will be noted that hard excrement rolling down an upper floor 14 is prevented from bounding back into a lower compartment by the respective lower partition 15.

The excrement or waste material deposited by the occupant in each of the compartments passes along the respective sloping floor, through the respective passage 16, and drops downwardly by gravity between the partitions 15, falling into a drawer 18 slidable in a drawer casing 19 mounted in the lower portion of the hutch. The drawer 18 is easily removable from the exterior of the hutch without disturbing the occupants thereof, as is seen clearly in Figures 1 and 2 and it is a simple expedient to remove the drawer, and dump the contents thereof into a suitable container. With this method of maintaining cleanliness in the hutch, it will be noted that the excrement never contacts with the ground in the vicinity of the hutch, but is preserved intact for future use as fertilizer. With reference now to Figure 2, it will be seen that the front wall 4 of the hutch is provided with an inverted T-shaped aperture 20 normally closed by a door or plate 21 slidable between a pair of guides 22 affixed to the front wall 4 (Figure 1). This construction provides a simple expedient for the cleansing of the space between the partitions 15 and the drawer casing 19 if such cleansing is ever necessary, it being a simple matter to remove the plate 21 and insert a broom through the slot 20, the leg of the slot providing ample space for the manipulation of the handle of the broom.

The partitions 15 are preferably secured in any desired manner, such as welding or brazing, along their front and rear edges to a pair of similar roller immediately above each of the doors 25. In the event the weather becomes so inclement as to be dangerous to the live stock, these curtains are pulled downwardly over the doors as seen in the left of Figure 2, the side edges of the curtain being held by means of vertical guides 27 disposed on each side of the doors and the position of the curtains being secured by the engagement of a tab 28 on the curtain over a stud 29 in the lower portion of the front wall 4. The protection resulting from the curtains or shades effectively prevents wind, rain and snow from entering the compartments of the hutch, and results in a material saving of lives of the occupants.

In hutches of this character as heretofore constructed, it was necessary for an attendant to individually place feed in each of the hutch compartments for the particular occupant therein. To avoid this undue labor and expense and to insure the proper and efficient feeding of each of the occupants of the hutch, each compartment is provided with a feeding device 30 (Figures 3 and 5). These feeding devices may be of any desired character, but are preferably of the type set forth and claimed in my co-pending application for Letters Patent entitled "Feeding device for live stock", Serial No. 532,434, filed April 24, 1931, issued December 19, 1933 as Patent No. 1,939,748. On each side of the hutch the feeders 30 are supplied from a chute 31 having branches 32 leading to the feeders in the upper compartment. The chute 31 leads from a feed bin 33 disposed in the upper portion of the hutch beneath the roof, and each of the bins 33 is provided with a transverse partition 34 which bisects the respective chute 31, so that each chute may supply one or a plurality of kinds of food. This automatic feeding arrangement is designed for supplying the livestock with foods of the character of grain. The bins are designed to hold a supply of food adequate for any desirable length of time, and are filled through hatches or trap doors 35 in the rear part 11 of the roof (Figures 4 and 5). In filling the bins, it is simply necessary to truck the supply of food along the rear side of a row of hutches and empty food directly from the truck into the bins in each hutch. To maintain the food in the bins in good condition over a period of time, ventilators 36 are provided in each of the upper portions 8 and 9 of the side walls 6 and 7. Obviously, such disposition of the food ventilating means can cause no draft in the region of the compartments within the hutch.

Rabbits and similar small live stock will not thrive well upon a food supply consisting of grain or mash only, but must also have food of the character of hay, alfalfa, and the like. For supplying this kind of food, the present hutch is provided on the rear wall thereof with a bin 37 (Figures 3 and 4) which is filled through a top door 38, and if for any reason it is so desired, the contents of the bin may be readily removed through an inwardly opening lower door 39. It will be seen that the door 39 is disposed above the lower margins of the walls of the bin so that this door is effectively protected from rain and snow and no moisture can seep into the contents of the bin. The bin 37 is made sufficiently wide so as to extend over a portion of every compartment within the hutch, and access from each compartment to the contents of the bin may be had through a grilled opening 40 (Figure 5) in the rear wall of the hutch. There is no danger from such feeding of an occupant of a lower compartment acquiring disease through the descent of food touched by an occupant of an upper compartment, since in raising live stock of this character, the common and proper practice is to immediately isolate any diseased animal.

For the automatic watering of the animals, the hutch is provided with an intake pipe line 41 entering the hutch in the upper portion thereof beneath the roof, and a branch pipe line 42 descends from the line 41 for supplying each vertical row of compartments, (Figure 2). Each of the branches 42 is provided with a plurality of spouts 43, each spout supplying a drinking vessel 44 in a compartment (Figures 2, 3, and 4). Of course, the branch pipe lines 42 are plugged at their lower ends, and the water supply is controlled by means of a suitable valve 45 in the main line 41.

To maintain the water in the drinking vessels at a proper level and to prevent overflow, a drainage system is provided which includes main drain pipes 46, each having a branch 47 extending upwardly within the hutch. The branches 47 extend directly into the drinking vessels in the upper compartment, and in the lower compartment elbow nipples 48 extend into the drinking vessels, the ends of the branches 47 and the nipples 48 each extending within its respective drinking vessel to a point somewhat below the upper surface of the vessel, (Figure 2).

To insure proper nesting means for the animals, a box-like structure 49 having three sides is disposed in the corner of each compartment defined by the end and front walls of the hutch, these walls together with the respective floor 14 and the member 49 providing an adequate nest box. On the rear wall thereof, the member 49 is provided with a suitable entrance aperture 50 which, as seen more clearly in Figure 5, is disposed materially above the floor 14. The member 49 is held removably in position by means of a pin 51 in the lower edge of the member engaged in a suitable aperture in the floor of the compartment, the upper portion of the member being held by the engagement of a suitable spring latch 52 secured to the hutch wall with a lug 53 attached to the upper part of the member 49. Between the member 49 and the rear wall 5 a cruciform entrance member 54 is removably mounted, this member being held in position by the engagement of a pin 55 thereon in a suitable aperture in the rear wall 5 (Figure 6). The cruciform entrance member prevents the mother animal from jumping directly into the nest and thus injuring her young, it being necessary for the mother animal to jump upon the first shelf or step 56 of the member, then over the upstanding central portion of the member onto a shelf 57 at the lower level of the entrance opening 50. Consequently, the mother animal is obliged to cautiously enter the nest. The cruciform entrance member also possesses the advantage of preventing the young from leaving the nest until they are able to return by themselves to the nest, since they cannot jump upon the shelf and over the central portion of the entrance member until they are able to return by the same route.

To enable an attendant to gain access to the nest box itself without disturbing the respective mother or the animals in any of the other compartments, the front wall of the hutch is provided with an aperture 58 immediately opposite each nest box, the aperture being kept normally closed by a plate 59 slidable in suitable guides 60. Immediately below the plate 59, or in any other desirable location, a name plate 61 is attached to the front wall of the hutch to enable careful records of the animals to be kept.

In the event a buck or male animal is housed in a compartment, or if for any other reason it is desired to remove the nest box member 49 and entrance member 54, it is a simple expedient to release the spring latch 52, disengage the pins 51 and 55 respectively from their sockets, and take both the nest box member and entrance member entirely out of the compartment.

To further guard the animals against cold and drafts, the lower portion of the hutch is provided with an insulation flooring 61, which may be of that character commonly referred to in the trade as "Celotex". The insulation flooring 61 is disposed materially below the lowermost floors 14 so as to provide therebetween a dead air space 62. The upper portion of the hutch immediately beneath the roof is likewise shielded by an insulation ceiling 63 of similar character.

From the foregoing description, it will be apparent that various parts of the hutch are preferably made of wood while other parts of the hutch are preferably made of metal. These metal parts are preferably the grilling in the apertures 40 in the rear wall of the hutch, the feeding and watering devices and their connecting pipe lines and chutes, and the feed bins 33 and 37. It is to be understood, however, that all metal parts accessible from within the compartments of the hutch are to be covered or treated with a suitable compound, such as porcelain or enamel, when the hutch is used for the housing of rabbits, to prevent these animals from licking the metallic parts in cold weather and thus injuring themselves.

It should also be noted that where the term "rabbit" is used herein and in the appended compartment arranged to provide an entrance thereto tortuous to an occupant in said hutch.

3. In combination with a live stock hutch, means defining a nest box in said hutch, and entrance means adjacent said first means tortuous to an occupant within said hutch and arranged to provide a barrier between the nest box and remainder of the hutch over which the animal must pass to enter the nest.

4. In combination with a live stock hutch, means defining a nest box having an entrance opening in said hutch, and a cruciform element adjacent said entrance opening with a wing thereof projecting vertically between the opening and the rest of the hutch to cause an occupant to use care in entering said nest box.

5. As an article of manufacture, a live stock hutch divided interiorly into a plurality of compartments, a feeding device in each compartment, a magazine associated with said hutch and arranged to distribute feed to each of said devices, and means associated with said hutch arranged to distribute another kind of feed to each of said compartments.

6. In a live stock hutch divided interiorly into a plurality of compartments, said hutch having a passage therein, a drawer slidable in said passage and positioned to collect excrement, means in said hutch for delivering excrement to said drawer from said compartments, said hutch having an opening therein above said drawer of a size sufficient to insert a cleansing tool, and a closure for said opening.

7. In a live stock hutch, a nest box structure disposed in a corner of the hutch, said structure having an opening therein spaced above the floor, and means adjacent said opening providing a barrier between said opening and the remainder unitary collector disposed to receive excrement passing through all of the spaces between floors and partitions.

12. In a live stock hutch, means including floors and partitions dividing the hutch interiorly into separate compartments on different levels, certain of said partitions being spaced from contact with the floors of the compartments bounded thereby, each floor sloping towards the respective spaced partition whereby excrement will pass by gravity through the respective space, said spaced partitions being of sufficient length to prevent excrement from one compartment bounding into another compartment, and a collector disposed to receive the excrement from a plurality of said compartments.

13. In a live stock hutch, means dividing the hutch interiorly into a plurality of confronting compartments, a sloping solid floor in each compartment, a collecting member for receiving excrement from all of the compartments, and guiding means adjacent the lower ends of said floors arranged to separate opposite compartments and to guide the excrement to said collecting member.

14. As an article of manufacture, a live stock hutch divided interiorly into opposite confronting compartments, said hutch having a space between said compartments, a unitary excrement collecting member disposed below said space, a sloping floor in each compartment slanting towards said space, and partition means in said space separating said compartments and leaving individual passages in said space for excrement from each compartment.

ERNEST WILKINSON.